April 15, 1930. J. J. SCHMITT 1,755,026
ROTARY DRIVE MECHANISM
Filed Aug. 18, 1927 5 Sheets-Sheet 1

INVENTOR.
Joseph J. Schmitt,
BY
Geo. P. Kimmel ATTORNEY.

April 15, 1930.   J. J. SCHMITT   1,755,026
ROTARY DRIVE MECHANISM
Filed Aug. 18, 1927   5 Sheets-Sheet 2
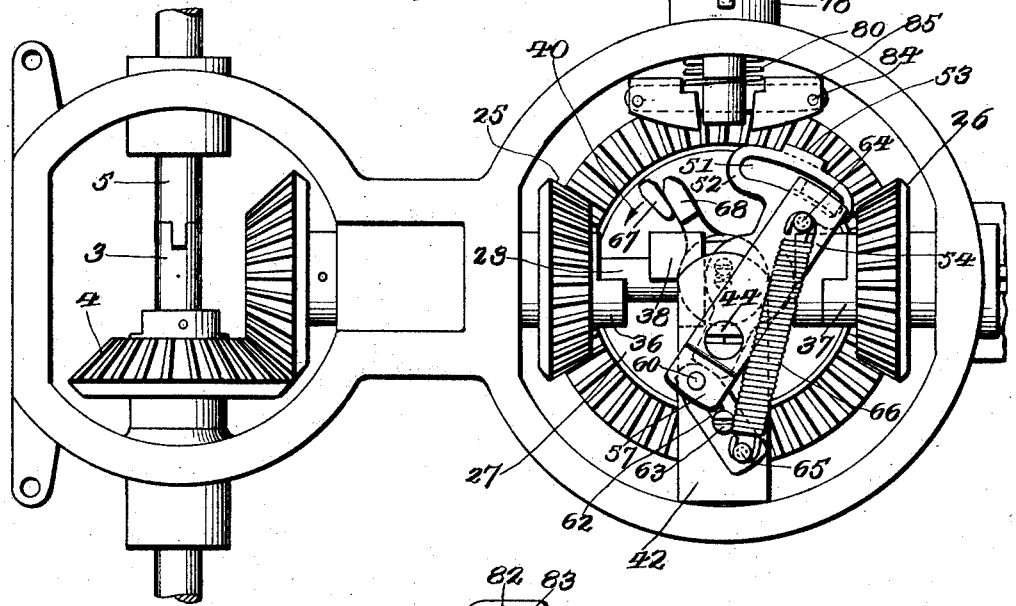
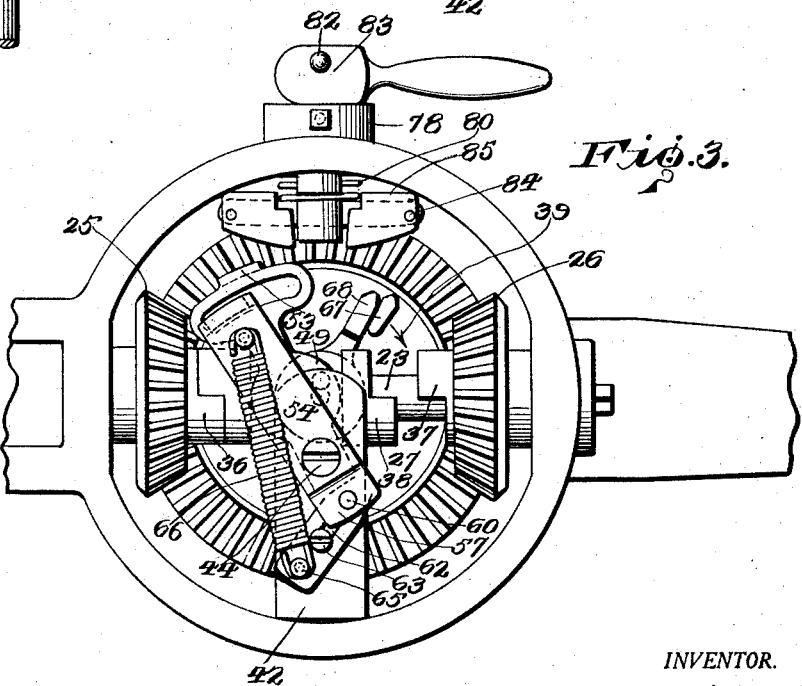
INVENTOR.
Joseph J. Schmitt.
BY
Geo. F. Kimmel  ATTORNEY.

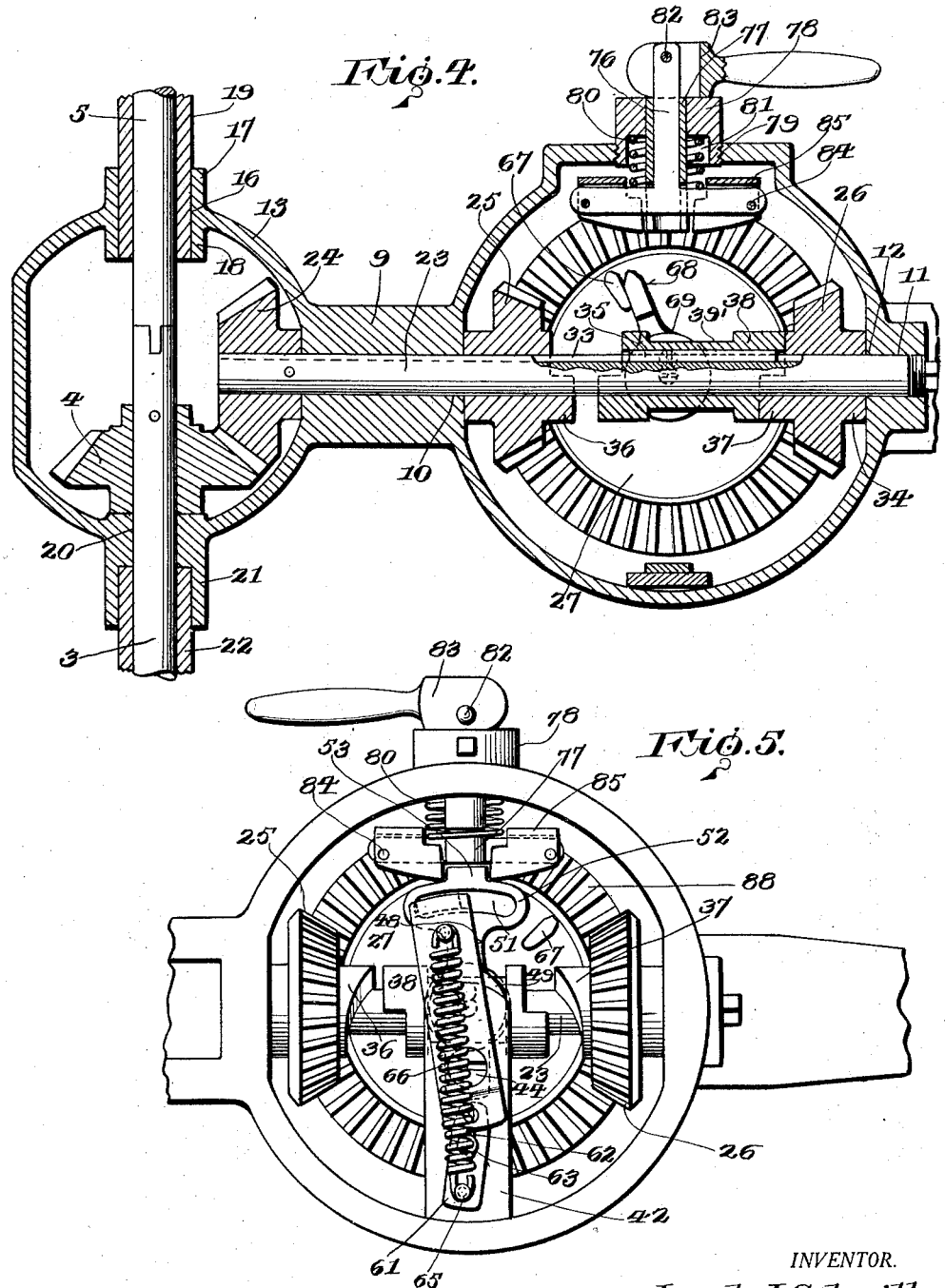

April 15, 1930.　　　J. J. SCHMITT　　　1,755,026
ROTARY DRIVE MECHANISM
Filed Aug. 18, 1927　　5 Sheets-Sheet 4

INVENTOR.
Joseph J. Schmitt,
BY
Geo. P. Kimmel  ATTORNEY.

April 15, 1930.          J. J. SCHMITT                1,755,026
                    ROTARY DRIVE MECHANISM
              Filed Aug. 18, 1927     5 Sheets-Sheet 5
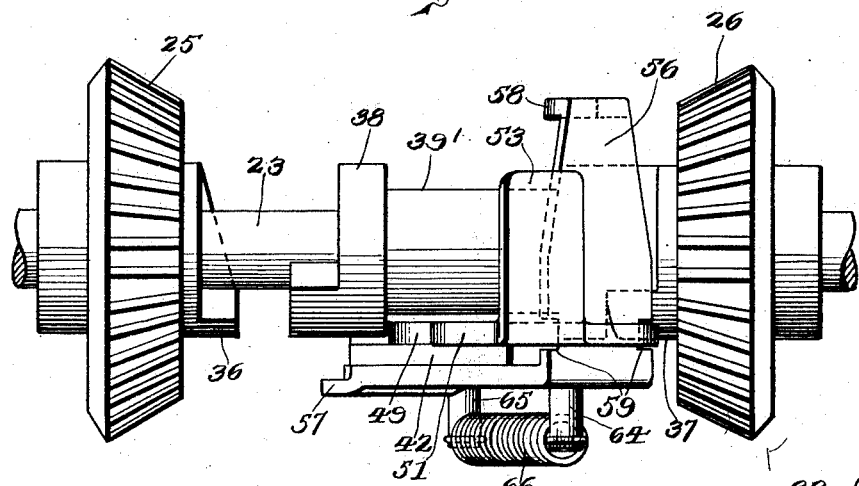
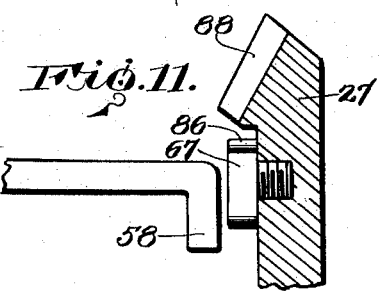
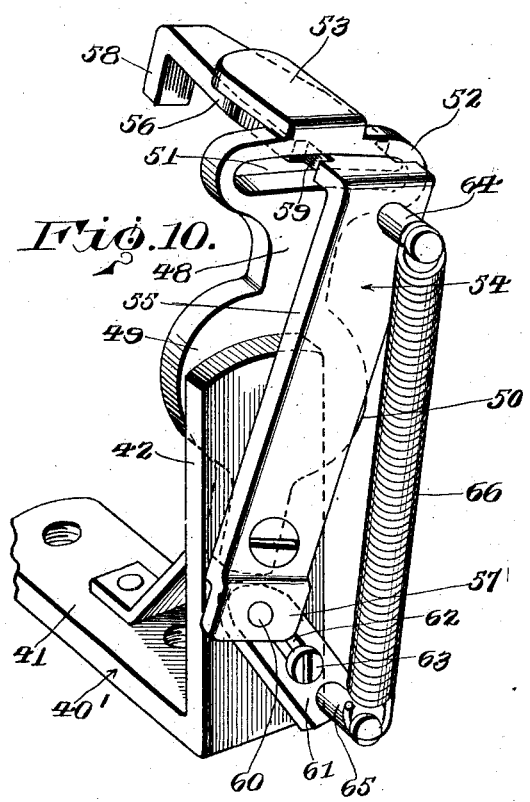
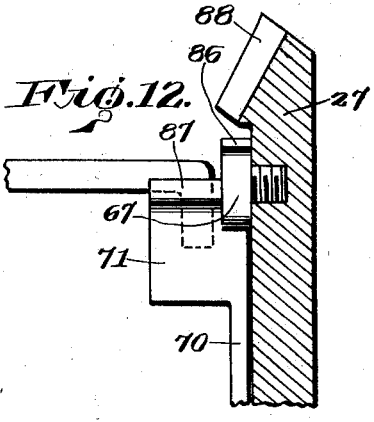
INVENTOR.
Joseph J. Schmitt,
BY
Geo. F. Kimmel ATTORNEY.

Patented Apr. 15, 1930

1,755,026

UNITED STATES PATENT OFFICE

JOSEPH J. SCHMITT, OF ALGOMA, WISCONSIN

ROTARY DRIVE MECHANISM

Application filed August 18, 1927. Serial No. 213,842.

This invention relates to an alternate rotary drive and throwout mechanism designed primarily for use in connection with the cylinders of washing machines, but it is to be understood that a mechanism in accordance with this invention may be employed in any connection for which it is found applicable, and the invention has for its object to provide, in a manner as hereinafter set forth, a mechanism of such class including means for automatically imparting plural revolutions alternately in opposite directions to a driven element, such as the cylinder of the washing machine, and further including as a part thereof means for throwing out the drive for the driven element when desired without discontinuing the operation of the driving means for the mechanism.

Further objects of the invention are to provide, in a manner as hereinafter set forth, an alternate rotary drive and throwout mechanism which is simple in its construction and arrangement, strong, durable, compact, automatic in its action when reversing the drive, thoroughly efficient in its use, conveniently installed, readily assembled, and comparatively inexpensive to set up.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 2 is a front elevation of the mechanism connected with its operating means and illustrating it in position for operating the element driven therefrom in the direction indicated by the arrow.

Figure 3 is a front elevation of the mechanism illustrating it in position for driving the element operated therefrom in a direction opposite to that shown in Figure 2.

Figure 4 is an elevation, partly in longitudinal section, of a mechanism in accordance with this invention and its driving means.

Figure 5 is an elevation of the mechanism set in throwout position to discontinue the operation of the element driven therefrom.

Figure 9 is a top plan view illustrating a clutching sleeve and its shifting means and further illustrating the power transmitting gears carried by the driving means for the mechanism.

Figure 10 is a perspective view of the shifting means for the clutching sleeve.

Figures 11 and 12 are fragmentary views showing the shifting means and driving gear for the driven element in two positions relative to each other.

Figure 1:
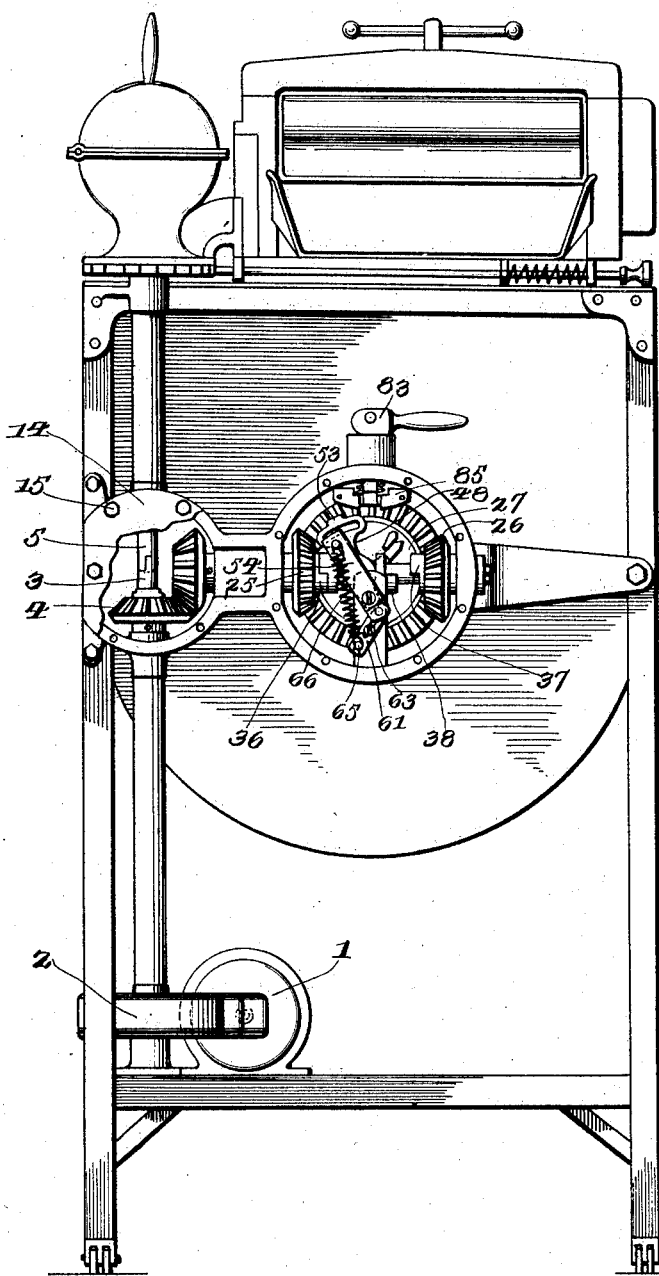
Figure 1 is an elevation of a washing machine, of that type including a rotary cylinder, showing the adaptation therewith of an alternate rotary drive and throwout mechanism in accordance with this invention.

Referring to the drawings in detail A generally indicates a washing machine of that type including a rotary cylinder and further of the type driven from an electric motor and such motor is indicated at 1, and has a driving connection as indicated at 2, for a vertically disposed shaft 3 which carries a bevel pinion 4 at its upper end. Associated with the shaft 3 and driven therefrom is a wringer operating shaft 5.

The foregoing elements are illustrated by way of example to illustrate one adaptation of a mechanism in accordance with this invention, and said shaft 3 and pinion 4 are provided for driving the operating shaft of the mechanism, but it is to be understood that the operating shaft of the mechanism can be driven from other suitable means than that as shown.

An alternate rotary drive and throwout mechanism, in accordance with this invention, and as illustrated, includes a circular open front housing 6 which has detachably connected to the front thereof, for the purpose of closing it, a plate 7 and the latter is connected to the housing body by holdfast devices 8. Formed integral with one side of the housing 6, and projecting laterally therefrom is a tubular extension 9 registering with an opening 10 formed in the housing body, and the other side of said housing 6 is formed with a short tubular extension 11 which registers with an opening 12 formed in the housing body. Integral with the outer end of the extension 9 is an open front housing 13 having connected therewith, for the purpose of closing the open front thereof, a plate 14 which is detachably secured in position by holdfast devices 15. The housing 13 at its top is formed with an opening 16 and registering therewith are oppositely extending collars 17, 18 which receive a bearing member 19 for the shaft 5. The housing 13 below the opening 16 is formed with an opening 20, which aligns with the opening formed by the bearing 19. The housing 13 is furthermore provided with a depending socket forming member 21 which registers with the opening 20 and is adapted to receive a bearing member or sleeve 22, for the shaft 3. The pinion 4 is arranged within the housing 13.

Figure 6:
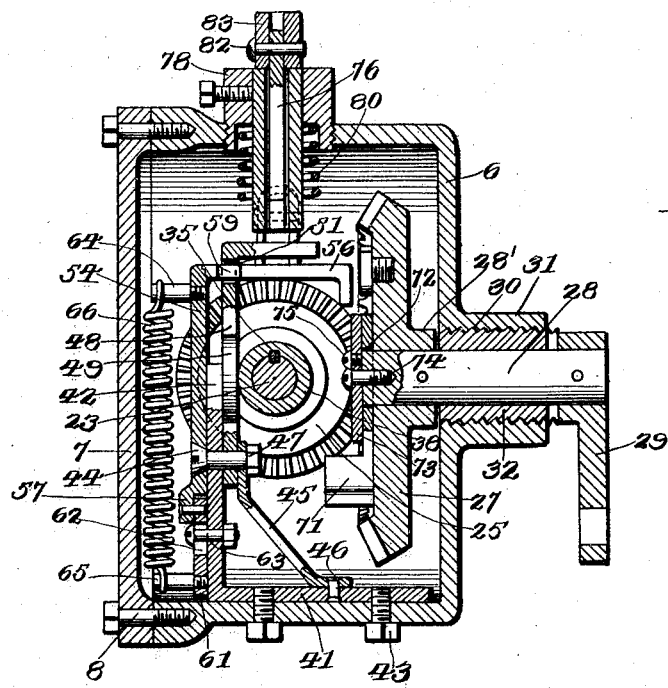
Figure 6 is a vertical sectional view of the mechanism.
Figure 7:
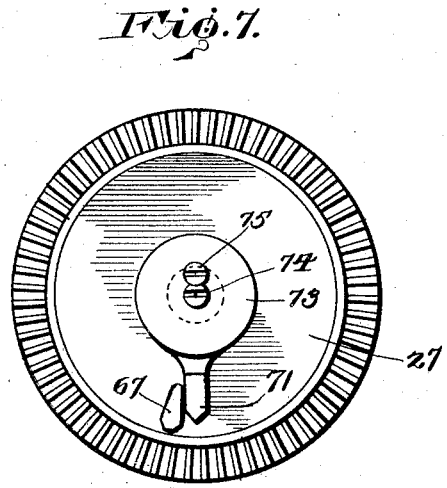
Figure 7 is an elevation of the driving gear for the driven element.
Figure 8:
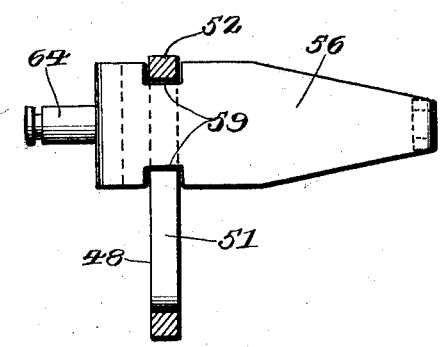
Figure 8 is a fragmentary view in sectional plan of a shifting means for the clutching sleeve.

The mechanism includes an operating shaft 23 which is driven from the pinion 4, but it is to be understood that said shaft 23 can be driven by any suitable means. The shaft 23, as shown, is of a length to extend from the interior of the housing 13, through the extension 9, opening 10, across the housing 6, through the opening 12 and into the extension 11. The extensions 9 and 11 provide bearings for the shaft 23. That end of the shaft 23 which extends into the housing 13 is provided with a bevel pinion 24 which meshes with and is driven from the pinion 4. Loosely mounted on the shaft 23 and within the housing 6, is a pair of oppositely disposed bevelled pinions 25, 26 which are loosely mounted on the shaft 23 and provide power transmitting means, when clutched to the shaft 23, for the bevel gear 27 which constitutes a driving element for the shaft 28 and the latter is adapted to be connected to a cylinder or other object which is to have imparted thereto plural revolutions in alternate directions. As illustrated in Figure 6 the shaft 28 is provided with a crank arm 29 which is to be connected to the element which is driven from the mechanism. The back of the housing 6 is formed with an opening 30 and a rearwardly extending sleeve 31 having its inner face forming a continuation of the wall of the opening 30, and the latter and the inner face of the sleeve 31 are threaded throughout. Threadedly engaging with the wall of the opening 30 and inner face of the sleeve 31 is a peripherally threaded bearing member 32 for the shaft 28. The beveled gear 27 includes a hub 28' which is interposed between the gear 27 and the back of the housing 6. The shaft 28, which carries the gear 27, projects slightly forwardly therefrom as shown in Figure 6. The shaft 23 extends at right angles with respect to the direction of the shaft 28 and said shaft 23 is formed with a lengthwise extending groove 33 in which is seated a key 35 for the purpose to be presently referred to. The pinions 25, 26 are provided with hubs 34 which abut against the inner face of the housing 6, see Figure 4. The pinions 25, 26 are in mesh with the beveled gear 27 at all times, but when said gears 25, 26 are not clutched to the shaft 23 the gear 27 is not driven by such pinions. The construction and arrangement of the mechanism is such, that when the pinion 25 is clutched to the shaft 23, the gear 27 will have imparted thereto two revolutions and after the gear 27 has made two revolutions, the pinion 25 will be automatically disconnected from the shaft 23 and the pinion 26 automatically connected to the shaft 23 thereby imparting to the gear 27 two revolutions in the opposite direction, or in other words the arrangement of the mechanism is such that the gear 27 will have imparted thereto two revolutions in alternate directions, that is to say the gear 27 will revolve twice in one direction and then revolve twice in the other direction.

The pinion 25 at that side opposite to the side from which the hub 34 projects, is formed with a clutch member 36 and the pinion 26 on that side opposite the side from which the hub 34 projects is provided with a clutch member 37. The pinions 25, 26 are arranged in spaced relation. Slidably mounted on the shaft 23, and rotating therewith, is a clutching sleeve 38 which is common to the clutching members 36, 37 and when said sleeve 38 is shifted to engage the clutch member 36 the pinion 25 will be clutched to shaft 23 and when the sleeve 38 is shifted in the opposite direction so that it will engage the clutch member 37, the pinion 25 will idle with respect to the shaft 23 and the pinion 26 will be clutched to the shaft 23. The pinion 25 provides means for driving the gear 27 in one direction and which is as indicated by the arrow 39, Figure 3, and the pinion 26 provides means for driving the gear 27 in the direction as indicated by the arrow 40, Figure 2. The clutch sleeve 38 is slidably connected to the shaft 23 by the key 35 and the arrangement is such that the sleeve 38 will be bodily carried with the shaft 23, but can shift lengthwise thereof when desired. The ends of the clutch sleeves 38 are constructed in a manner to coact with the clutch members 36, 37 to clutch the pinions 25, 26 of the shaft 23 when desired. The clutch sleeve 38 is provided with a wide peripheral groove 39' of appropriate depth and slidably engaging with the side walls of the groove 39' is a shifting mechanism therefor.

With reference to Figures 9 and 10, the shifting mechanism for the clutch sleeve is clearly illustrated and said means comprises an angle shaped bracket 40' consisting of a horizontally disposed arm 41 and a vertically disposed arm 42. The arm 41 is secured to the inner face of the housing 6, at the bottom thereof, see Figure 6, by the holdfast devices 43 and it is disposed centrally of the housing 6 and extends from rear to front of the latter. The arm 42 is arranged at the outer end of the arm 41 and positioned rearwardly with respect to the open front of the housing 6.

Mounted in the arm 42 is a pivot bolt 44 which extends into the upper end of a support 45 arranged rearwardly of the arm 42 and said support 45 is fixedly secured at its lower end, as at 46, to the arm 41. The pivot bolt 44 at its rear end carries a securing nut 47 which abuts against the upper end of the support 45. Arranged rearwardly of the arm 42 and pivotally connected at its lower end upon the bolt 44 is a shifting member 48 for the clutch sleeve 38 and said member 48 is provided intermediate its ends with a pair of oppositely extending semi-circular projections 49, 50 which ride against the side walls of the groove 39 for the purpose of shifting the clutch sleeve. The shifting member 48 when it swings on its pivot in a direction towards the gear 26 shifts the sleeve 38 for engagement with the clutching member 37 and when the shifting member 48 swings on its pivot in a direction towards the pinion 25 it is moved into clutching engagement with the clutch member 36 whereby the pinion 25 is clutched by the shaft 23. The upper end of the shifting member 48 is enlarged and formed with a transversely extending slot 51 which is of a length greater than the normal width of the shifting member 48. The enlarged upper end 52 of the member 48, said end 52 being provided with the slot 51, is further formed with a rearwardly extending arm 53 which associates with the throwout means in a manner to be hereinafter referred to.

Associated with the shifting member 48, for the purpose of moving it in opposite directions upon the pivot bolt 44, is a spring controlled trip member 54 formed of a vertical arm 55 and a horizontally disposed arm 56 which projects rearwardly from the upper end of the arm 55, and the lower end of the latter is offset as indicated at 57. The rear end of the arm 56 is formed with a depending nose 58. The arm 56 extends through the slot 51 and has each of its side edges formed with a notch 59 to overlap the ends of the extension 52 when the trip member 54 is actuated to shift the member 48. The arm 55 of the member 54, in proximity to the offset portion 57 is mounted on the pivot bolt 44 and swings thereon. The head of the pivot bolt 44 is countersunk in the arm 55. Pivotally connected to the offset portion 57, of the arm 55, as at 60, is a depending link 61, formed with a lengthwise extending slot 62, through which extends a holding screw 63, the latter being secured to the arm 42 of the bracket 40', thereby providing a sliding connection between the link 61 and the bracket 40. The link 61 is of materially less length than the arm 55 and connected to the upper end of the latter, as well as projecting forwardly therefrom is a stud or pin 64 and connected to lower end of the link 61, as well as projecting forwardly therefrom is a stud 65. Arranged forwardly of the trip member 54 and link 61 is a controlling spring 66 for said trip member and link and said spring 66 has its upper end connected to the pin 64 and its lower end to the pin 65. The coaction of the screw 63 and slot 62 limits the relative pivotal movement between the link 61 and arm 55 and also expands the spring 66 as the link 61 and arm 55 are moved through dead center. The spring 66 is a snapping spring and tends to provide for the quick shifting of the trip member 54 in either direction to throw the shifting member 48.

The forward face of the gear 27 is provided with a lug 67 and which coacts with an abutment member 68 for the purpose of moving the trip member 54 to a position whereby it will be snapped by the spring 66 causing thereby the shifting of the member 48 in the manner to move the sleeve 38 on the shaft 23. The abutment member is positioned at the forward face of the gear 27 and is pivotally connected to the forwardly projecting end of the shaft 28. The abutment member 68 comprises a circular body portion 69 formed with a radially disposed arm 70 having an enlarged outer end portion 71 of a width to engage the nose 58 and lug 67. The body portion 69 is formed with a circular opening 72 for the passage of the forward end of the shaft 28. A retaining plate 73 is secured to the forward end of the shaft 28 and maintains the body portion 69 thereon. The abutment member 68 can freely pivot on the shaft 28 rearwardly of the retaining plate 73 and the later is secured in position by a holdfast device 74 having associated therewith a lock screw 75. The enlarged outer end 71 of the abutment member 68 acts to normally maintain said member 78 in position as shown in Figure 6, and remains in such position until it is engaged by the lug 67 and carried around with the gear wheel 27. The latter makes two revolutions in one direction before the end 71 engages the nose 58 and shifts the trip member 54 in a direction away from that pinion which is coupled to the shaft 23. When the end 71 moves the member 54 in such direction, after the latter passes off center, the spring 66 will quickly snap the member 54 in the same direction causing it to engage the member 48 carrying said member therewith and causing the sleeve 38 to be moved from clutching engagement with one pinion and into clutching engagement with the other pinion. The spring 66 when performing its snapping action shifts the members 48 and 54 simultanenously and acts with such force as to cause a semi-circular projection, of the member 48, to engage a side wall of the groove 39 and shift the sleeve 38.

The throwout means to prevent the operation of the gear 27 without discontinuing the operation of the shift 23 comprises a vertically movable inverted T-shaped carrier 76, having its stem operating through a bearing sleeve 77, secured in an inverted socket forming member 78 which is secured in the top of the housing 6, as at 79. The carrier 76 is spring controlled and the controlling spring therefor is indicated at 80 and which surrounds the bearing sleeve 77, abuts against the face of the socket 89 formed in the member 78 and bears against the horizontal arm of the carrier 76. The vertical arm of the carrier 76 extends above the socket forming member 78 and has pivotally connected therewith as at 82, a cam lever 83 for elevating the carrier 76 against the action of its controlling spring 80 and also provides means for lowering the carrier when desired. Pivotally connected to each end of the horizontal arm of the carrier 76, as at 84, is a latch member 85 which overlaps the arm. The outer end of the latch member 85 is pivoted to the outer end of the horizontal arm of the carrier. The latch members 85 are arranged in spaced relation. When the carrier 76 is swung to its lowered position, by the cam lever 83, it will be positioned in the manner as shown in Figure 5 and the latch members 85 will be arranged at each side of the arm 53 of the shifting member 48, and thereby will retain the shifting means for the sleeve 38 in a vertical position against the action of the controlling spring 66 whereby the clutching sleeve 38 will be maintained clear of the clutch members 36, 37, so that the pinions 25, 26 will idle on the shaft 23 while the latter is rotating, and under such condtions the operation of the gear 27 will be stopped and the shaft 28 dormant. When the shifting means for the sleeve 38 is in the position as shown in Figure 5, the lug 67 is to one side of said shifting means and the arm 70 will be in a position to depend from the body portion 69. The nose 58, of the arm 56 of the trip member 54 clears the lug 67 and the latter as well as the outer end of the enlarged portion 71 of the arm 70 are beveled and the beveled end of the lug 67 is indicated at 86 and the beveled end of the arm 70 at 87. The lug 67 is arranged in proximity to the beveled teeth 88 of the gear 27 and said lug 67 is of a length when it is engaged by the arm 70 to project from the beveled end 87 of said arm, and in this connection see Figure 12. The width of the portion 71 of the arm 70 is materially greater than the width of the nose 58, and in this connection see Figure 12.

It is thought that the many advantages of an alternate rotary drive and throwout mechanism, in accordance with this invention and for the purpose set forth can be readily understood, as it will provide for plural revolutions in one direction and then automatically shift to provide for plural revolutions in the opposite direction and such action is had alternately and automatically, and although the preferred embodiment of the invention is as illustrated and described, yet it is to be undertsood that changes in the details of construction can be had which fall within the scope of the invention as claimed.

What I claim is:

1. In a rotary drive mechanism of that type including a drive shaft, a pair of gears loosely mounted thereon, a clutch slidable on the shaft for alternately clutching the gears thereto, a driven shaft, and a gear secured thereto and meshing with the drive shaft gears, the combination of a support, a clutch shifting member pivoted thereto and formed with a transverse slot, a trip member pivoted to the support and having an arm extending through said slot, a link pivoted to the trip member, means connected with the trip member and link to yieldingly hold them off center with respect to each other, said support and link having coacting means for limiting relative movement between the link and trip member, and means adapted to be actuated by the driven shaft gear for engagement with said arm to shift said trip member and link past dead center to provide for the operation of said clutch shifting member.

2. In a rotary drive mechanism of that type including a drive shaft, a pair of gears loosely mounted thereon, a clutch slidable on the shaft for alternately clutching the gears thereto, a driven shaft, and a gear secured thereto and meshing with the drive shaft gears, the combination of a support, a clutch shifting member pivoted thereto, a trip member pivoted to the support, one of said members having an angularly disposed arm, the other of said members being formed with a transverse slot through which said arm extends, a link pivoted to the trip member, means connected with the trip member and link to yieldingly hold them off center with respect to each other, said support and link having coacting means for limiting relative movement between the link and trip member, and means adapted to be actuated by the driven shaft gear for engagement with said arm to shift said trip member and link past dead center to provide for the operation of said clutch shifting member.

3. In a rotary drive mechanism of that type including a drive shaft, a pair of gears loosely mounted thereon, a clutch slidable on the shaft for alternately clutching the gears thereto, a driven shaft, and a gear secured thereto and meshing with the drive shaft gears, the combination of a support, a clutch shifting member pivoted thereto, a trip member pivoted to the support for actuating the clutch shifting member, a link pivoted to the trip member, means connected with the trip member and link to yieldingly hold them off center with respect to each other, said support and link having coacting means for limiting relative movement between the link and trip member, and means adapted to be actuated by the driven shaft gear for engagement with the trip member to shift the trip member and link past dead center to provide for the operation of said clutch shifting member.

4. In a rotary drive mechanism of that type including a drive shaft, a pair of gears loosely mounted thereon, a clutch slidable on the shaft for alternately clutching the gears thereto, a driven shaft, and a gear secured thereto and meshing with the drive shaft gears, the combination of a support, a clutch shifting member pivoted thereto and formed with a transverse slot, a trip member pivoted to the support and having an arm extending through said slot, a link pivoted to the trip member and formed with a longitudinal slot, means connected with the trip member and link to yieldingly hold them off center with respect to each other, an element extending from the support through said longitudinal slot and coacting with the wall of the latter for limiting relative movement between the link and trip member, and means adapted to be actuated by the driven shaft gear for engagement with said arm to shift said trip member and link past dead center to provide for the operation of said clutch shifting member.

5. In a rotary drive mechanism of that type including a drive shaft, a pair of gears loosely mounted thereon, a clutch slidable on the shaft for alternately clutching the gears thereto, a driven shaft, and a gear secured thereto and meshing with the drive shaft gears, the combination of a support, a clutch shifting member pivoted thereto, a trip member pivoted to the support for actuating the clutch shifting member, a link pivoted to the trip member, means connected with the trip member and link to yieldingly hold them off center with respect to each other, means to limit relative movement between the link and trip member, means adapted to be actuated by the driven shaft gear for engagement with the trip member to shift the trip member and link past dead center, a pair of latch members for engagement with said clutch shifting member, and a cam lever for actuating said latch members to engage them with the clutch shifting member to prevent the operation of the latter.

6. In a rotary drive mechanism of that type including a drive shaft, a pair of gears loosely mounted thereon, a clutch slidable on the shaft for alternately clutching the gears thereto, a driven shaft, and a gear secured thereto and meshing with the drive shaft gears, the combination of a support, a clutch shifting member pivoted thereto and formed with a transverse slot, a trip member pivoted to the support and having an arm extending through said slot, a link pivoted to the trip member, means connected with the trip member and link to yieldingly hold them off center with respect to each other, means to limit relative movement between the link and trip member, means adapted to be actuated by the driven shaft gear for engagement with said arm to shift the trip member and link past dead center, an angularly disposed extension on the clutch shifting member, a pair of spaced, counter-balanced latch members for engagement with said extension on opposite sides thereof, and a cam lever for actuating said latch members to engage them with the clutch shifting member to prevent the operation of the latter.

7. In combination with driving and driven members operative connections therebetween to effect reversal of movement of the driven member, said operative connections embodying a movable element, a shifter for actuating said movable element, driven member actuating means for imparting initial movement to the shifter, and quick-acting means for completing the movement of the shifter, said quick-acting means comprising a pair of levers pivotally connected together, one of said levers having an additional fixed pivotal mounting, and a tensioned spring connected with the remote ends of said levers.

8. In combination with driving and driven members operative connections therebetween to effect reversal of movement of the driven member, said operative connections embodying a movable element, a shifter for actuating said movable element, a driven member actuating means for actuating said shifter through a part of its movement, and quick-acting means for completing the movement of the shifter, the latter comprising a bracket on which the shifter is pivotally mounted, a pair of levers pivotally connected together at their ends, one of said levers having a pivotal mounting on the bracket in common with said shifter and the other having a pin and slot connection with said bracket, and a spring tensioned between the remote ends of said levers, the first of said levers having an extension passing through a slot in the shifter, said slot exceeding in length the width of the part passing through it.

9. In combination with driving and driven members operative connections therebetween to effect reversal of movement of the driven member, said operative connections embodying a movable element, a shifter having a pivotal mounting at one end and an operative connection with said movable element, said shifter being provided with an arcuate slot, a lever having a pivotal mounting in common with the mounting of said shifter and an extension passing through the slot thereof, a spring tensioned between the free end of the lever and a remote point on the opposite side of the pivotal mounting thereof, and driven member actuated means for initiating the actuation of the lever, the spring of the latter completing the lever's movement and the actuation of the shifter by the engagement of its extension with one end of the slot in the shifter.

10. In combination with driving and driven members, operative connections therebetween to effect reversal of movement of the driven member, said operative connections embodying a movable element, a pivotally mounted shifter having an operative connection with said movable element and a slot on the opposite side of said operative connection from said pivot, a pivotally mounted lever having a lateral arm extending through said slot and spring actuated to engage the arm with either end of said slot and means carried by the driven member for engaging the arm and rocking the lever, said means comprising a ring carried by the driven member and provided with a radial tongue having a lateral extension engageable with the lateral arm of said lever, and a pin carried by the driven member and movable independently of the ring until engaged with the tongue thereof.

11. In combination with driving and driven members, operative connections therebetween to effect reversal of movement of the driven member, said operative connections embodying a movable element, a shifter operatively connected with said movable element, means carried by one of said members for actuating said shifter at specified intervals, and a device selectively positionable in and out of the path of said shifter for arresting movement of the same and retaining said movable element in neutral position, said device comprising a manually actuable plunger, and spaced pivotally mounted pawls carried by the same and defining an intervening shifter receiving space.

12. The structure of the preceding claim in which said device comprises a manually actuable plunger, spaced pivotally mounted pawls carried by the same and defining an intervening shifter receiving space, a bearing in which said plunger is mounted, a handle pivotally connected with the upper end of the plunger and having a cam element bearing on the head of the bearing, and a spring operatively connected with the plunger to maintain the cam element in contact with the bearing.

In testimony whereof, I affix my signature hereto.

JOSEPH J. SCHMITT.